J. T. FRITSCHE.
MOWER.
APPLICATION FILED SEPT. 5, 1908.

936,881.

Patented Oct. 12, 1909.
2 SHEETS—SHEET 1.

WITNESSES:
J. H. Gardner
H. R. Woddell

INVENTOR:
John T. Fritsche,
BY
E. T. Silvius,
ATTORNEY.

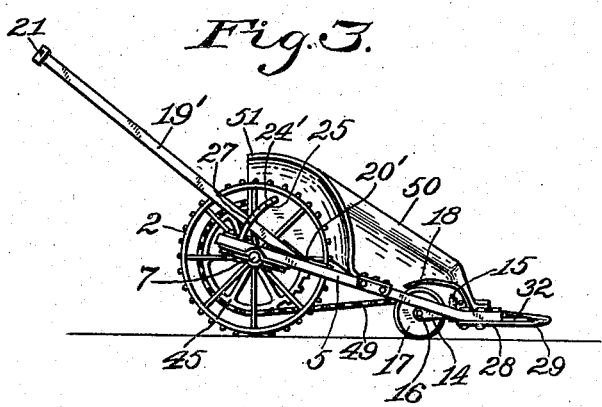
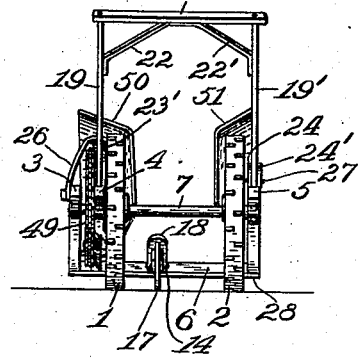
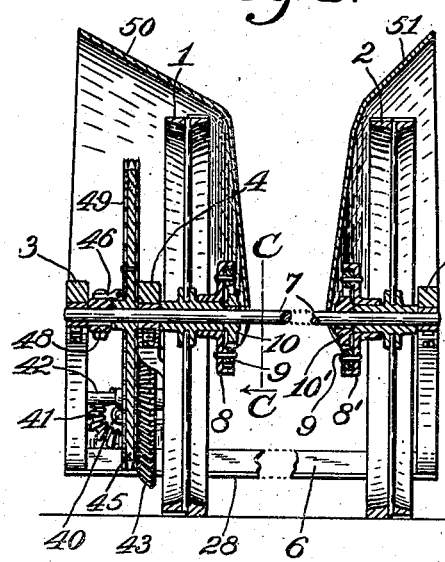
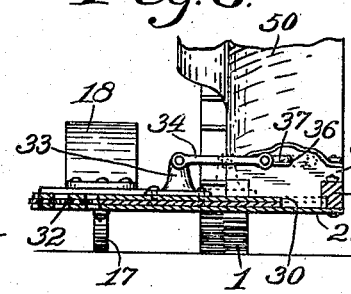
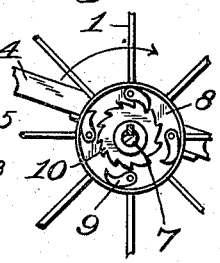
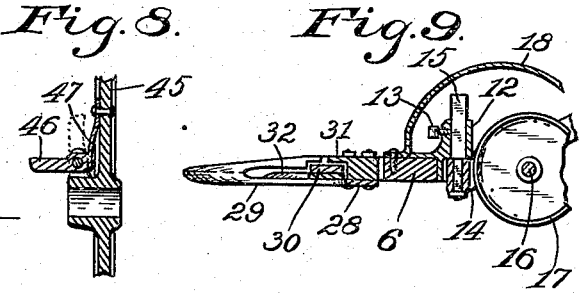
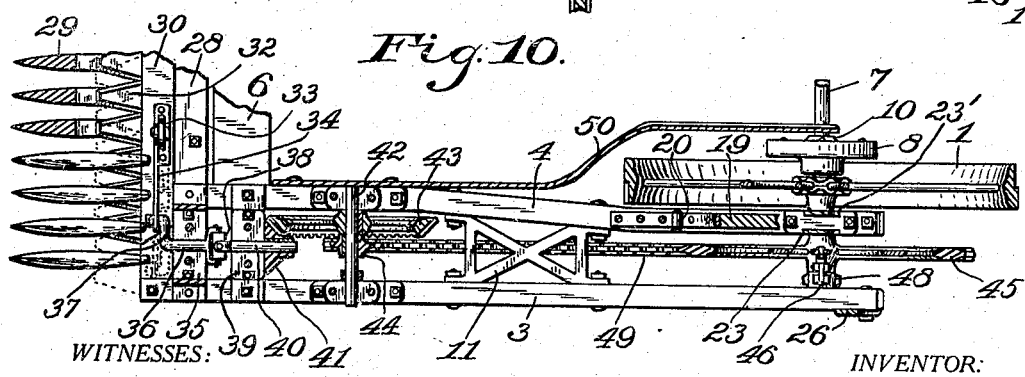
J. T. FRITSCHE.
MOWER.
APPLICATION FILED SEPT. 5, 1908.
936,881. Patented Oct. 12, 1909.
2 SHEETS—SHEET 2.

UNITED STATES PATENT OFFICE.

JOHN THOMAS FRITSCHE, OF PERRY TOWNSHIP, MARION COUNTY, INDIANA.

MOWER.

936,881.  Specification of Letters Patent.  Patented Oct. 12, 1909.

Application filed September 5, 1908. Serial No. 451,800.

*To all whom it may concern:*

Be it known that I, JOHN THOMAS FRITSCHE, a citizen of the United States, residing in Perry township, in the county of Marion and State of Indiana, have invented certain new and useful Improvements in Mowers; and I do declare the following to be a full, clear, and exact description of the invention, reference being had to the accompanying drawings, and to the figures of reference marked thereon, which form a part of this specification.

This invention relates to mowing machines that are designed to be used for cutting tall grass or weeds, and the invention relates particularly to a relatively large size of hand power mowing machine that is adapted not only for mowing lawns, but for mowing in orchards or in other places where there may be considerable grass to be cut and where horse power mowers could not conveniently operate.

The object of the invention is to provide an improved mower construction that may be cheaply produced for the above mentioned and other uses and which will be adapted to mow close up to hedges or fences, and to provide a mower that may be operated by one or two men for mowing tall grass or weeds or other vegetation; a further object being to provide a relatively large hand power mower that will be of light weight and be durable and economical in use.

The invention comprises certain novel features of construction in mowers, and in the parts and combinations and arrangements of parts, as hereinafter particularly described, and defined in the accompanying claims.

Figure 1:
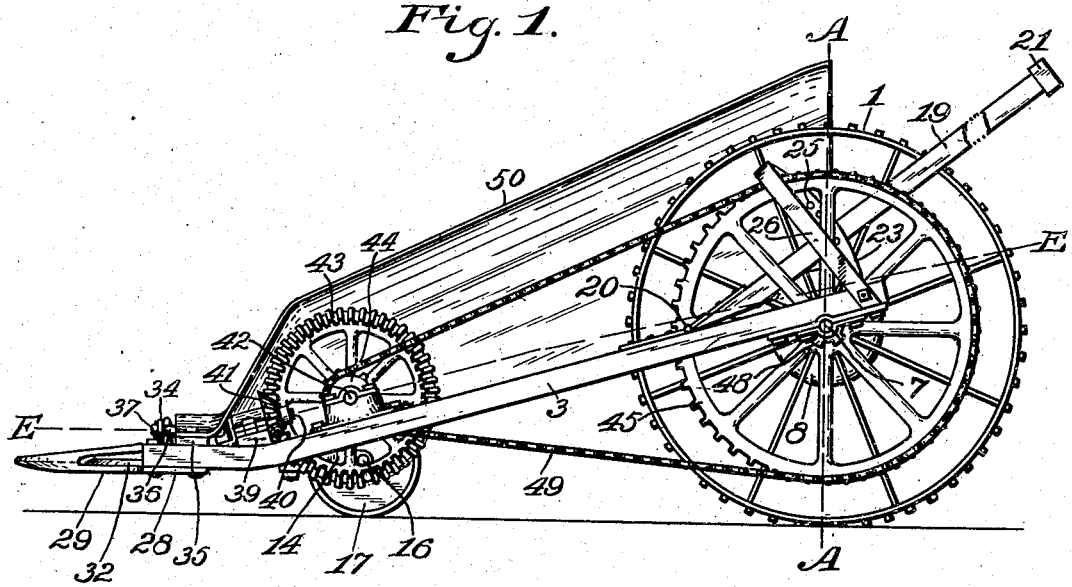
Figure 2:
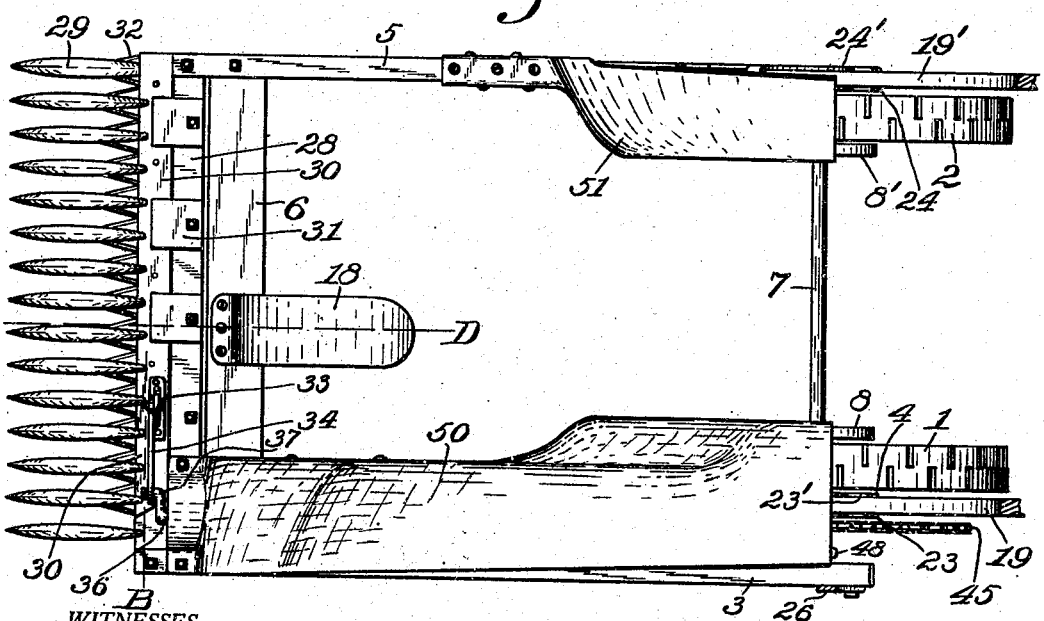

Referring to the drawings, Figure 1 is a side elevation of a mower constructed substantially in accordance with the invention with parts of the machine broken away; Fig. 2, a top plan of the machine with parts thereof broken away; Fig. 3, a side elevation of the complete machine; Fig. 4, a rear elevation of the complete machine; Fig. 5, a fragmentary transverse sectional view approximately on the line A A in Fig. 1; Fig. 6, a fragmentary sectional view approximately at the plane of the line B in Fig. 2; Fig. 7, a fragmentary sectional view at the line C C in Fig. 5; Fig. 8, a sectional view reproducing parts shown in Fig. 5, on an enlarged scale; Fig. 9, a fragmentary vertical sectional view approximately on the plane of the line D in Fig. 2; and Fig. 10 a fragmentary sectional view as on and near the line E E in Fig. 1, parts of the machine being shown as top plan views.

Similar reference characters throughout the drawings indicate corresponding elements or features of construction.

The improved mower comprises two driving wheels 1 and 2 of unusually large diameter which carry the rear parts of the machine, and a frame consisting of three longitudinal members 3, 4 and 5 to the forward portions of which are attached a transverse member 6, the rear ends of the longitudinal members being suitably journaled on a driving axle 7 which is mounted rotatively in the driving-wheels. The driving-wheels have flanges 8 and 8' that are rigid thereon, each flange having a plurality of pawls 9 thereon which are adapted to engage ratchet-wheels 10 and 10' that are suitably secured to the axle 7 adjacent to the flanges, so that when the driving-wheels move forward they will rotate the axle, the ratchet mechanism permitting the wheels to rotate backward on the axle without rotating the axle. Other equivalent clutch mechanism may be employed in lieu of that described. A brace 11 is preferably secured between the longitudinal members 3 and 4 at the middle portions thereof. A vertical socket 12 is secured on the member 6 of the frame and is provided with a set-screw 13. A suitable wheel-frame 14 is provided which has an upright shank 15 that is mounted adjustably in the socket 12 and secured by the set-screw 13, so that the wheel-frame may be adjusted vertically with respect to the frame member 6. The wheel-frame extends rearward from its shank and has an axle 16 on which a guide-wheel 17 is mounted, and a guard 18 is mounted on the member 6 and extends over the guide wheel and its frame. Two handle bars 19 and 19' are connected by means of hinges 20 and 20' to the frame members 4 and 5 forward of the driving axle and are connected at their ends by a hand-rail 21. A pair of angle braces 22 and 22' are secured to the handle-bars and the hand-rail. A pair of curved standards 23 and 23' are mounted on the frame member 4 and similar standards 24 and 24' are mounted on the frame member 5, the standards having pin-holes 25 therein. A brace 26 connects the tops of the standards 23 and 23' and is attached to the frame member 3 for bracing the standards laterally. Pins 27 or bolts are employed in the holes 25 and in suitable openings in the handle bars for connecting the handle-bars to the standards adjustably, so that the hand rail 21 may be raised or lowered to suit the convenience of the operator.

A guide-bar 28 is secured to the longitudinal frame members forward of the member 6 and carries guide-fingers 29, a knife-bar 30 being mounted on the guide-bar and retained by guide-plates 31, there being knives 32 secured to the knife-bar, all of which may be of any suitable construction desired. A pivot block 33 is secured on the top of the knife bar 30 and has a pitman 34 connected thereto.

A journal-box 35 is mounted on the forward ends of the frame members 3 and 4 and supports a rotative shaft 36 having a crank 37 which is connected to the pitman 34, the shaft 36 being horizontal and having a block 38 pivoted thereto that forms a part of a universal coupling. A journal-box 39 is mounted also on the members 3 and 4 and supports a counter-shaft 40 that is pivoted to the block 38, the axis of the shaft 40 being inclined, the rear end of the shaft having a bevel gear wheel 41 secured thereto. A shaft 42 is suitably journaled on the members 3 and 4 transversely to and opposite the rear end of the shaft 40, the shafts 36 and 40 being arranged longitudinally between the members 3 and 4. A bevel gear-wheel 43 is secured to the shaft 42 and engages the gear-wheel 41, a sprocket-wheel 44 being secured also to the shaft 42. A relatively large sprocket-wheel 45 is mounted on the axle 7, so as to rotate thereon and is provided with a dog 46 that is engaged by a spring 47 to hold the dog either in a horizontal position or in a vertical position, the dog normally engaging a toothed-wheel 48 which is secured to the axle, so that when the dog is withdrawn the axle may rotate without turning the sprocket-wheel 45. A sprocket chain 49 extends over the sprocket-wheel 45 and the sprocket-wheel 44 whereby to drive the latter wheel and consequently the cutting knives. A guard 50 is mounted on the frame-member 4 and extends partially over the driving-wheel 1 and covers the mechanism that is mounted on the forward portions of the frame members 3 and 4, another guard 51 being mounted on the frame member 5 and extending partially over the driving-wheel 2.

It will be seen that the frame members 3 and 4 are arranged at the outer side of the driving-wheel 1 and the frame member 5 is arranged at the outer side of the driving-wheel 2, so that the main frame is relatively broad and substantially supports a relatively long knife-bar, thus adapting the machine to cut a wide swath ahead of the driving-wheels.

In practical use, one or two men may push the mower by means of the hand-rail 21, and the machine may be adjusted to cut relatively high or low by adjusting the shank 15 in the socket 12. The grass will be thrown up and over the frame member 6 and will be deflected from the machinery by the guards 18, 50 and 51. When it is desired to move the mower from one place to another without operating the cutting knives the dog 46 will be disengaged from the toothed-wheel 48.

Having thus described the invention, what is claimed as new, is—

1. In a mower, the combination of two driving wheels, an axle mounted rotatively in the wheels, a pair of longitudinal frame members journaled at their rear ends on the axle at the outer side of one of the driving wheels, a single longitudinal frame member journaled at its rear end on the axle at the outer side of the other one of the two driving wheels, a transverse frame member attached to the longitudinal frame members near the forward ends thereof and having a socket mounted thereon, a wheel-frame mounted adjustably in the socket, a guide-wheel mounted in the wheel-frame, a driving sprocket-wheel on the axle and driven thereby between the two of the pair of longitudinal frame members, cutting apparatus mounted on the longitudinal frame members forward of the transverse frame member, driving connections between the sprocket-wheel and the cutting apparatus, clutching devices mounted on the axle and clutching devices mounted on the inner sides of the driving wheels for connecting the axle to the wheels to be rotated by the wheels, a handle-bar connected to one of the pair of longitudinal members, a handle-bar connected to the single longitudinal frame member, and a hand-rail attached to the handle-bars.

2. In a mower, the combination of two driving wheels having each a flange on one side thereof, pawls mounted on the flanges, an axle mounted rotatively in the wheels, ratchet-wheels secured to the axle adjacent to the flanges and in contact with the pawls, two longitudinal frame members mounted on the axle at the outer side of one of the driving wheels, a single longitudinal frame member mounted on the axle at the outer side of the other one of the driving wheels, said axle being rotatively connected with the rear ends of said frame members, a transverse frame member attached to the forward portions of said longitudinal members, a socket mounted on said transverse member and provided with a fastening-device, a wheel-frame having a shank mounted adjustably in the socket and engaged by the fastening-device, a guide-wheel mounted in the wheel-frame, cutting apparatus mounted on the longitudinal frame members forward of the transverse frame member, a driving sprocket wheel on the axle and driven thereby between the two of the pair of longitudinal frame members, driving connections between the sprocket-wheel and the cutting apparatus, a handle-bar connected to the single longitudinal member, a handle-bar connected to the inner one of the two longitudinal members, and a hand-rail attached to the handle-bars.

3. In a mower, the combination of two driving wheels, an axle mounted in the driving wheels to be rotated thereby, two longitudinal frame members journaled on the axle at the outer side of one of the driving wheels, the innermost one of the members having a standard and also a hinge mounted thereon, a brace attached to the outermost one of the members and also to the top of the standard, a single longitudinal frame member journaled on the axle at the outer side of the other one of the two driving wheels and having a standard and also a hinge mounted thereon, a transverse frame member attached to the longitudinal frame members and having a socket mounted on the middle portion thereof, a wheel-frame mounted adjustably in the socket, a guide-wheel mounted in the wheel-frame, a pair of handle-bars attached to said hinges and connected adjustably to said standards, a hand-rail attached to said handle-bars, cutting apparatus mounted on the longitudinal frame members, a sprocket-wheel mounted rotatively on the axle, a dog mounted on the sprocket-wheel, a toothed wheel secured to the axle to be engaged by the dog, means for holding the dog out of engagement with the toothed wheel, and driving mechanism connected with the sprocket-wheel and the cutting apparatus.

4. A mower comprising two driving wheels, an axle mounted in the driving wheels to be rotated thereby, two longitudinal frame members mounted on the axle at the outer side of one of the driving wheels, a single longitudinal frame member mounted on the axle at the outer side of the other one of the driving wheels, said axle being connected rotatively with the rear ends of the frame members, a transverse frame member attached to the forward ends of the longitudinal frame members, a socket attached to the transverse frame member, a set-screw mounted in the socket, a wheel-frame mounted adjustably in the socket and engaged by said set-screw, a guide-wheel mounted in the wheel-frame, a guide bar attached to the longitudinal frame members forward of said transverse frame member, a knife-bar mounted movably on said guide-bar, a pivot-block attached to said knife-bar remote from its ends, a pitman connected to said pivot-block, a horizontal shaft mounted on said two longitudinal frame members and having a crank that is connected to said pitman, a block pivoted to said shaft, an inclined shaft mounted on said two longitudinal frame members and having said block pivoted thereto, a bevel gear wheel secured to the inclined shaft, a counter-shaft mounted transversely on said two longitudinal frame members and having a bevel gear wheel secured thereto that engages said bevel gear wheel that is on said inclined shaft, a sprocket wheel secured to said countershaft, a pair of handle-bars hinged on the tops of two of said longitudinal frame members, a hand-rail attached to the handle-bars, braces attached to the handle-bars and to the hand-rail, a plurality of curved standards secured to said longitudinal frame members to which said handle-bars are hinged and connected to said handle-bars, gearing connecting the axle with the sprocket-wheel, a brace attached to said two longitudinal frame members between the axle and said counter-shaft, a guard attached to the transverse frame member and extending over the guide-wheel, and a guard attached to said two longitudinal frame members and extending over said shafts and the gearing connected therewith.

5. In a mower, the combination with a pair of driving wheels, and an axle driven by the wheels, of a frame comprising a plurality of longitudinal members mounted on the axle and two of the members having each a hinge mounted thereon forward of the axle, said two members having each a curved standard mounted thereon that has pin-holes therein, one of said standards having a brace attached thereto that is attached also to another one of the plurality of longitudinal members, a pair of handle-bars connected to said hinges, one to each hinge, pins in said pin holes and extending into the handle-bars, and cutting apparatus mounted on said frame.

In testimony whereof, I affix my signature in presence of two witnesses.

JOHN THOMAS FRITSCHE.

Witnesses:
HARRY D. PIERSON,
E. T. SILVIUS.